United States Patent
Enns et al.

(10) Patent No.: US 10,505,948 B2
(45) Date of Patent: Dec. 10, 2019

(54) METHOD AND APPARATUS FOR SECURE AGGREGATED EVENT REPORTING

(71) Applicant: Trilliant Networks, Inc., Redwood City, CA (US)

(72) Inventors: Frederick Enns, Menlo Park, CA (US); Michel Veillette, Waterloo (CA)

(73) Assignee: Trilliant Networks, Inc., Redwood City, CA (US)

( * ) Notice: Subject to any disclaimer, the term of this patent is extended or adjusted under 35 U.S.C. 154(b) by 0 days.

(21) Appl. No.: 15/341,137

(22) Filed: Nov. 2, 2016

(65) Prior Publication Data
US 2017/0134395 A1   May 11, 2017

Related U.S. Application Data

(60) Provisional application No. 62/251,296, filed on Nov. 5, 2015.

(51) Int. Cl.
*H04L 29/06* (2006.01)
*H04L 9/32* (2006.01)
(Continued)

(52) U.S. Cl.
CPC .......... *H04L 63/123* (2013.01); *G06F 21/554* (2013.01); *H04L 9/3242* (2013.01);
(Continued)

(58) Field of Classification Search
CPC ..... H04L 63/123; H04L 41/28; H04L 41/069; H04L 41/0686; H04L 43/08;
(Continued)

(56) References Cited

U.S. PATENT DOCUMENTS

| 7,299,500 B1 * | 11/2007 | Klebe | H04L 63/0428 |
| | | | 726/26 |
| 8,171,364 B2 * | 5/2012 | Veillette | G01D 4/004 |
| | | | 714/748 |

(Continued)

FOREIGN PATENT DOCUMENTS

WO   WO-2013126759 A2   8/2013

OTHER PUBLICATIONS

International Search Report and Written Opinion dated Mar. 9, 2017 for PCT Application No. PCT/US2016/060246.
(Continued)

*Primary Examiner* — John B King
(74) *Attorney, Agent, or Firm* — Moser Taboada; Leonard Linardakis

(57) ABSTRACT

A computer implemented method and system for secure aggregated event reports. The method comprises determining, by a device, that a status change has occurred at the device; receiving, by the device, a status change report from one or more child devices; generating, by the device, a device status change record; generating a record verification field, comprising: combining a nonce, an event type, and a unique device identifier; generating a message integrity check code for the combined nonce, event type and device identifier; and appending the message integrity check code to the device status change record; appending the device status change record to the received status change report; and transmitting, by the device, the status change report to one or more parent devices toward a head end system.

17 Claims, 5 Drawing Sheets

(51) Int. Cl.
*H04L 12/26* (2006.01)
*H04L 29/12* (2006.01)
*G06F 21/55* (2013.01)
*H04L 12/24* (2006.01)
*H04W 84/18* (2009.01)
*H04L 29/08* (2006.01)
*H04W 4/70* (2018.01)
*H04W 12/00* (2009.01)

(52) U.S. Cl.
CPC ........ *H04L 41/069* (2013.01); *H04L 41/0686* (2013.01); *H04L 41/28* (2013.01); *H04L 43/065* (2013.01); *H04L 43/08* (2013.01); *H04L 61/6022* (2013.01); *H04L 63/0428* (2013.01); *H04L 63/0876* (2013.01); *H04L 63/126* (2013.01); *G06F 2221/2111* (2013.01); *H04L 67/12* (2013.01); *H04W 4/70* (2018.02); *H04W 12/00512* (2019.01); *H04W 84/18* (2013.01)

(58) Field of Classification Search
CPC . H04L 9/3242; H04L 63/126; H04L 61/6022; H04L 63/0876; H04L 63/0428; H04L 43/065; H04L 67/12; G06F 21/554; G06F 2221/2111; H04W 84/18; H04W 4/70
See application file for complete search history.

(56) References Cited

U.S. PATENT DOCUMENTS

| | | | |
|---|---|---|---|
| 8,370,697 B2* | 2/2013 | Veillette | G01D 4/004 714/748 |
| 8,699,377 B2* | 4/2014 | Veillette | H04L 45/34 370/254 |
| 8,970,394 B2 | 3/2015 | Michel et al. | |
| 9,621,457 B2* | 4/2017 | Veillette | H04L 45/34 |
| 9,942,824 B2* | 4/2018 | Veillette | H04L 45/34 |
| 10,305,887 B2* | 5/2019 | Enns | H04L 63/06 |
| 2003/0023845 A1* | 1/2003 | VanHeyningen | H04L 9/0643 713/151 |
| 2006/0036733 A1* | 2/2006 | Fujimoto | H04L 61/2015 709/225 |
| 2007/0005963 A1 | 1/2007 | Eldar et al. | |
| 2008/0044014 A1* | 2/2008 | Corndorf | H04L 63/12 380/37 |
| 2008/0046039 A1* | 2/2008 | Corndorf | H04L 9/0844 607/60 |
| 2009/0135018 A1 | 5/2009 | Veillette et al. | |
| 2009/0138777 A1* | 5/2009 | Veillette | G01D 4/004 714/748 |
| 2010/0061272 A1* | 3/2010 | Veillette | H04L 45/34 370/254 |
| 2010/0161986 A1* | 6/2010 | Bucker | H04L 63/123 713/169 |
| 2011/0010543 A1* | 1/2011 | Schmidt | H04W 12/10 713/168 |
| 2011/0029489 A1 | 2/2011 | Zhao | |
| 2011/0055568 A1* | 3/2011 | Farrugia | H04L 9/321 713/170 |
| 2012/0039218 A1 | 2/2012 | Palchaudhuri et al. | |
| 2012/0179941 A1* | 7/2012 | Veillette | G01D 4/004 714/57 |
| 2012/0192025 A1* | 7/2012 | Veillette | H04L 67/025 714/749 |
| 2013/0145169 A1* | 6/2013 | Poovendran | H04L 9/0643 713/181 |
| 2013/0247185 A1* | 9/2013 | Viscuso | G06F 21/554 726/22 |
| 2013/0326224 A1 | 12/2013 | Yavuz | |
| 2014/0226667 A1* | 8/2014 | Veillette | H04L 45/34 370/392 |
| 2014/0281505 A1* | 9/2014 | Zhang | H04L 9/3268 713/158 |
| 2015/0256401 A1 | 9/2015 | Zinger et al. | |
| 2015/0294123 A1* | 10/2015 | Oxford | G06F 21/78 713/193 |
| 2016/0373418 A1* | 12/2016 | Stahl | G06F 21/33 |
| 2017/0134395 A1* | 5/2017 | Enns | H04L 43/08 |
| 2017/0180355 A1* | 6/2017 | Enns | H04L 63/06 |

OTHER PUBLICATIONS

Supplementary European Search Report dated Feb. 27, 2019 for Application No. 16862932.7.

* cited by examiner

| | COMMUNICATION STACK AND APPLICATION HEADER | PROTOCOL SPECIFIC |
|---|---|---|
| | FIRST REPORT TIME | 2016 10 11 15 05 00 |
| | EVENT TYPE | POWER FAILURE |
| RECORD 1 | DEVICE A IEEE ADDRESS | CMAC (FIRST REPORT TIME + MAC ADDRESS) |
| RECORD 2 | DEVICE B IEEE ADDRESS | CMAC (FIRST REPORT TIME + MAC ADDRESS) |
| RECORD 3 | DEVICE C IEEE ADDRESS | CMAC (FIRST REPORT TIME + MAC ADDRESS) |
| RECORD 4 | DEVICE D IEEE ADDRESS | CMAC (FIRST REPORT TIME + MAC ADDRESS) |
| RECORD 5 | DEVICE E IEEE ADDRESS | CMAC (FIRST REPORT TIME + MAC ADDRESS) |

FIG. 3

METHOD AND APPARATUS FOR SECURE AGGREGATED EVENT REPORTING

CROSS-REFERENCE TO RELATED APPLICATIONS

This application claims priority to U.S. Provisional Patent Application Ser. No. 62/251,296 filed Nov. 5, 2015, which is incorporated by reference herein in its entirety.

BACKGROUND

Field

Embodiments of the present invention generally relate to event reporting and more specifically, to a method and apparatus for secure aggregated event reporting.

Description of the Related Art

In the utility delivery space, there have been numerous technological advances in efforts to provide improved methods and systems for monitoring and controlling the delivery and use of various utility products (e.g., electricity, water, gas, street lighting, etc.). For example, Smart Grid systems, Advanced Metering Infrastructure (AMI) systems and the like have been developed, which incorporate system devices (e.g. meters) or existing system devices retrofitted with modules that include at least a communication interface, configurable microprocessor, and storage capacity. These devices are configured to communicate using predetermined protocols with other nodes in the network, Wide Area Network (WAN), and/or the Neighborhood Area Network (NAN) access points (e.g., collectors, bridges, mesh gates) in the utility's network.

A utility network may be employed to monitor utility devices, and perform tasks such as reporting meter readings to head end systems. For example, meters within the AMI system may determine if delivery of power is occurring or if there is a power outage, and may report power readings to a data collection process in the head end system. The ability to achieve this monitoring automatically is an important advancement over the wired, drive-by or house-to-house meter reading methodologies of the past.

The timely reporting of power outages and restoration across a NAN is critical to maintaining utility access for all customers. Currently, power outage and restoration reports are aggregated before they are sent to a back-end system as described in U.S. Pat. No. 8,970,394, titled "Aggregated Real-time Power Outages/Restoration Reporting (RTPOR) in a Secure Mesh Network," which is incorporated herein by reference in its entirety. Briefly, power outage or restoration reports are aggregated as they are transmitted through the network to the head end system. Aggregating the reports reduces message volume when there is a large outage event. A complete and accurate set of power event reports is important for the utility to efficiently deploy its resources in order to restore the service. A complete and accurate record is also important for the utility to document its regulatory service level requirements.

Networks that connect devices to a monitoring process are also being deployed in Distribution Automation (DA) systems for the Smart Grid, in smart cities systems, in Internet of Things systems, and in industrial plant process and control systems. All of these systems have event reports that may need to be secure and scalable when an event is widespread. The types of widespread event that might be reported are power outage and restorations, pipe line pressure events, temperature events, seismic events, gunshot detection events, signal light failures, street light failures, flooding, and the like.

Secure aggregated event reporting may also be utilized for acknowledging multicast and broadcast message delivery. Typically, broadcast and multicast messages sent to large numbers of devices are not acknowledged by the receiving devices because the quantity of acknowledgements would overwhelm the system. The aggregated event reporting may be used to securely acknowledge receipt of the broadcast and multicast messages.

However, aggregate event reports have no end-to-end security because each device that the aggregate report passes through must be able to modify the report. As such, the aggregated reports are subject to malicious hackers. The hacked device can falsely report large numbers of power outage events from a plurality of devices. This type of scaled attack is costly to a utility because resources may be deployed to address a large outage where no outage exists.

The current state-of-the-art for end-to-end security uses either transport layer security such as the Internet Engineering Task Force Transport Layer Security (IETF TLS) or Datagram Transport Layer Security (DTLS) protocols or application sub-layer security which protects the entire application protocol data unit, but cannot protect the individual data records. Therefore, there is a need for a method and apparatus for secure aggregated event reporting.

SUMMARY

An apparatus and/or method is provided for secure aggregated event reporting substantially as shown in and/or described in connection with at least one of the figures, as set forth more completely in the claims These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 3 depicts an exemplary secure aggregated report, according to one or more embodiments of the invention;

Figure 1:
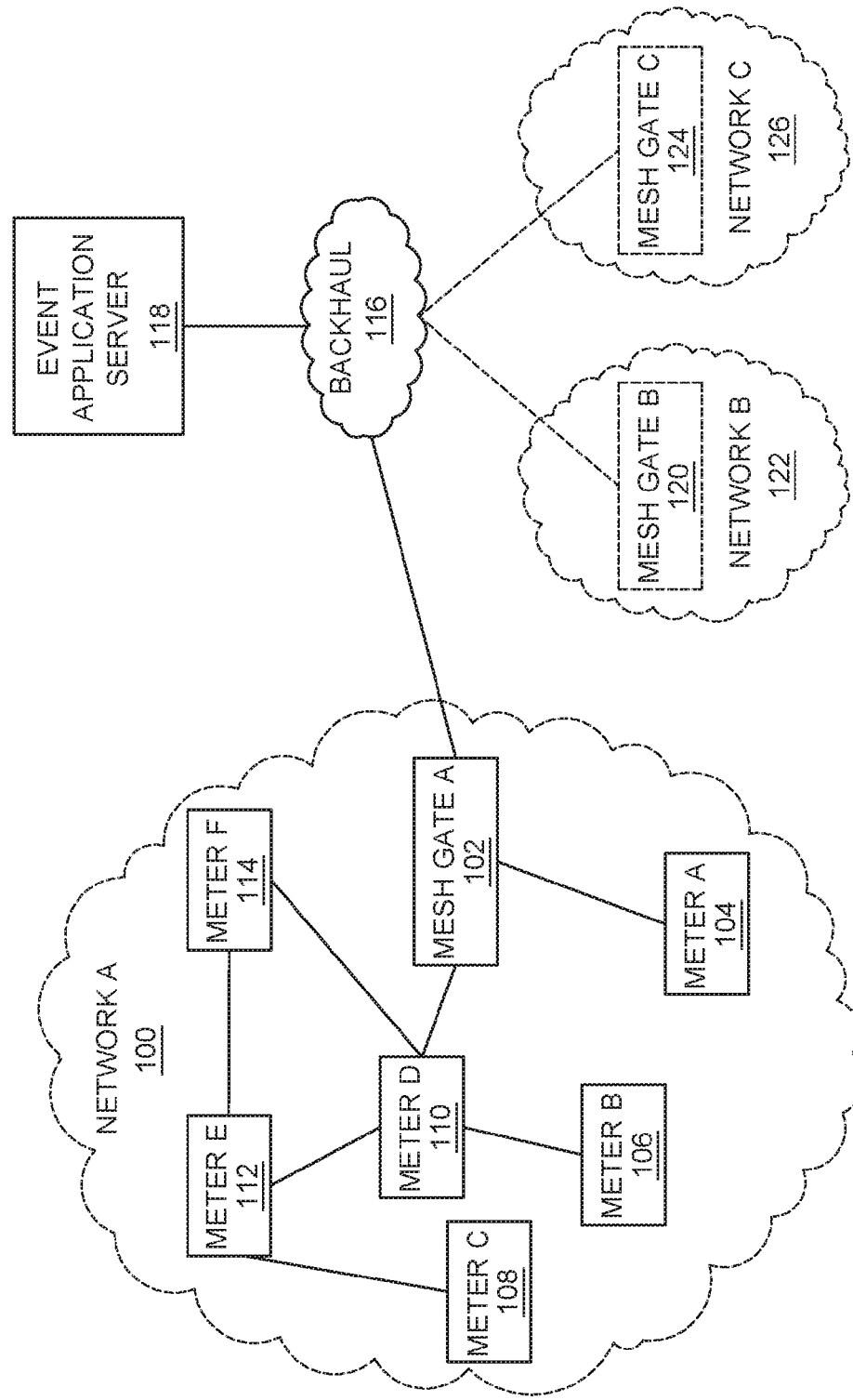
FIG. 1 depicts a block diagram of an exemplary AMI system for providing secure aggregated event reporting for meters, according to one or more embodiments of the invention.

While the method and apparatus is described herein by way of example for several embodiments and illustrative drawings, those skilled in the art will recognize that the method and apparatus for secure aggregated event reporting is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for secure aggregated event reporting defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the invention provide a system and method for secure aggregated event reporting. As each device (e.g., meter) reports an event, such as a power outage and/or a power restoration, the reporting device adds one or more records to an aggregated event report. In addition to information regarding the event, for example, the start time and end time of an event, duration of the event, an identity of the reporting device, and/or a location of the reporting device, the record also includes cryptographically secured information. When received on the back-end system, the cryptographically secured information can be verified as being received from said reporting device. This verification ensures the integrity of the associated data. In some embodiments, the reporting device may extract a time of a first record (i.e. First Report Time) in the report and append to the time a unique identifier for the device, such as a Media Access Code address. The First Report Time plus Media Access Code address is then protected by a message integrity check (MIC) using, for example a keyed hash function that uses an encryption key that is unique to the reporting device. The hash is appended to the record and the record is then appended to the report.

When the report is received on the back-end system, each record is validated using the MIC key uniquely associated with the reporting device, such that if the hash generated on the back-end system matches that included in the record, the record is verified as coming from the reporting device. As such, a compromised device can only generate a false record or report for itself, which significantly reduces the scale of a malicious event reporting attack.

It is effective to use a nonce whenever a key hash function is calculated to preserve the security of the key. Although, a First Report Time in addition to a Media Access Control address may be used for the keyed hash function, any nonce combined with a unique identifier of the device may be used to create the hash that is included in the appended record. For example, the nonce can be a non-repeated random number, or a counter that increments with each use. Other unique identifiers may be device serial numbers and the like.

Various embodiments of a method and apparatus for secure aggregated event reporting are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. As used herein, the term device may include a mesh device, a bridged device, a routed device, or any device in a store and forward network. The store and forward network may use a mesh or a tree architecture. Although the present disclosure is described using utility networks, for example those employed in Smart Grid and Advanced Metering Infrastructure (AMI) networks, those skilled in the art will appreciate that the present invention also applies to the broad Internet of Things (IoT) space.

FIG. 1 depicts a block diagram of an exemplary AMI system 100 for providing secure aggregated event reporting for meters, according to one or more embodiments of the invention. A network A 100 may include a NAN access point (e.g., mesh gate A) 102 and a plurality of meters: meters A 104, B 106, C 108, D 110, E 112, and F 114. Although a mesh network is depicted for network A 100, the network could alternatively be a tree network. A NAN access point may be referred to herein as a mesh gate, NAN-WAN gate, a collector, or a concentrator. In some embodiments, the mesh gate A 102 may communicate with an event application server 118 over a backhaul 116 (e.g., a WAN) and it will be appreciated that any number of mesh gates (e.g., mesh gate B 120 and mesh gate C 124) may communicate with the event application server 118. In some embodiments, the mesh gate A 102 may directly communicate with the event application server 118 via a wired connection. The network A 100 may be any store and forward network where devices receive a message and pass the message on. The network A 100 may be a mesh network, a tree network, or the like. When a device receives the message, the device has the ability to add the device's own status change record to the report. As used herein, the term device may include a mesh device, a routed device a bridged device, or any device in a store and forward network.

In addition to the mesh gate A 102, the network A 100 may include a plurality of devices (e.g., meters, as shown) or communication hubs, which cover a geographical area. The devices may be in communication with or may otherwise include one or more utility sensors for monitoring utility usage, such as gas, water, or electricity usage and usage patterns at a specific customer location. Alternative devices may include thermostats, user displays, and other components for monitoring utilities, which may be part of a home area network ("HAN"). As discussed in detail below, the mesh gate A 102 may aggregate information from devices (e.g., meters A 104, B 106, C 108, D 110, E 112, and F 114) within the network A 100 and transmit the information to the event application server 118.

The meters A 104, B 106, C 108, D 110, E 112, and F 114 may be associated with the network A 100 through direct or indirect communications with the mesh gate A 102. Each meter may forward transmissions from other meters within the network A 100 towards the mesh gate A 102. It will be appreciated that while only six meters are depicted in the network A 100, any number of devices may be deployed to cover any number of utility lines or locations, subject to bandwidth constraints with the network A 100 and the mesh gate A 102. Although the devices in the network A 100 are depicted as meters, those skilled in the art will appreciate that the devices may be any type of device capable of reporting an event.

As depicted, only meters A 104 and D 110 are in direct communications with mesh gate A 102. However, meters B 106, E 112 and F 114 can all reach mesh gate A 102 through meter D 110. Meter D 110 is therefore described as a parent of meters B 106, E112 and F114. Similarly, meter C 108 can reach mesh gate A 102 through meter E 112 and meter D 110. Accordingly, meter A 104 may be described as being 1 "hop" from mesh gate A 102; meter D 110 may be described as being 2 "hops" from mesh gate A, and meter C 108 may be described as being 3 "hops" from mesh gate A.

It will be appreciated that the backhaul 116 may be any communication medium capable of transmitting digital information. For example, the backhaul 116 may be the Internet, a cellular network, a private network, a phone line configured to carry a dial-up connection, or any other network.

The event application server 118 may be a computing device configured to receive information, such as status change information, meter readings, or any other data from a plurality of networks and meters. The event application server 118 may also be configured to transmit instructions to the networks, mesh gates, and devices. In certain embodiments, the event application server 118 may be a central processing system including one or more computing systems (i.e., one or more server computers). Where the event application server 118 includes more than one computing system, the computing systems can be connected by one or more networks and the system may be referred to as a head end system. The networks, e.g., networks B 122 and C 126 are similar to network A 100 in operation, as discussed above.

Figure 2:
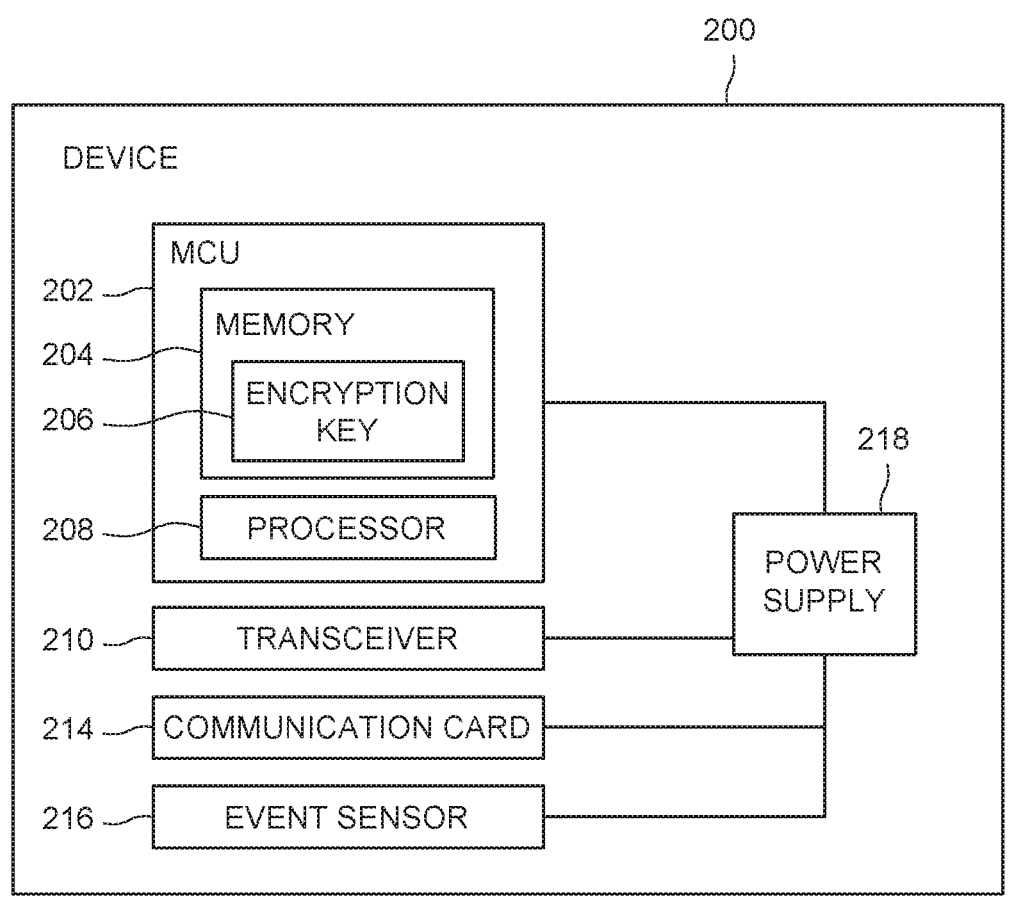
FIG. 2 depicts a block diagram of an exemplary device (e.g., meter) for use within a store and forward network such as a network for secure aggregated event reporting, according to one or more embodiments of the invention.

FIG. 2 depicts a block diagram 200 of an exemplary device (e.g., meter B 106) for use within a store and forward network such as network A 100 for secure aggregated event reporting, according to one or more embodiments of the invention. A device 200 may include a microcontroller unit (MCU) 202, a communication card 214, an event sensor 216, and a battery, other power or energy storage device or power supply 218. The MCU 202 may include a memory 204, a processor 208, and a transceiver 210. The memory 204 includes an encryption key 206, which is used to produce a keyed hash of a record in an aggregated report, where the record is added by the device 200 as described in further detail below. Generally, the communication card 214 may interface between the MCU 202 and a wired or wireless network. The event sensor 216 performs sensor measurements, which are read by the processor 208. The processor 208 generates a report that is converted by the communication card 214 to signals for transmission over the network. The memory 204 may store instructions and run-time variables for execution. For example, the memory 204 may include both volatile and non-volatile memory. The memory 204 may also store a history of sensor readings from the event sensor 216 and an incoming queue of server instructions. As discussed below, the memory may store status information of the device, and may also store status information received from one or more child devices and one or more encryption keys 206 used for cryptography.

A device 200 may communicate with an access point and other devices over a network. For example, the device 200 may be an electricity smart meter installed in a residential building or other location to monitor electricity usage. The meter may also control access to energy in response to server instructions, for example, by reducing or stopping the flow of electricity. The device 200 may be a mesh gate.

In some embodiments, one or more devices 200 may provide an event status change report to a head-end event application server 118 in real-time or near real-time via an access point. As used herein, a "status change" may refer to a loss of power (i.e., a power outage) or a restoration of power (i.e., a power restoration), temperature, pressure drop, pressure surge, pipe failure, sound (e.g., gunshot detection), motion (e.g. seismic activity), signal light outages, street light outages, or flood detection. In the event of an outage, the device may employ a secondary power source that backs up the device's real-time clock, such as a power supply 218, super capacitor or the like, to provide a "last gasp" of activity. For example, a super capacitor may provide the device with approximately 15 seconds of recognition time to determine whether a power outage is momentary or lasting and another approximately 7.5 seconds of time for "last-gasp" radio transmissions.

In one embodiment, a device 200 first determines that a status change has occurred for a period of time lasting at least as long as a predetermined recognition period. The predetermined recognition period may be any amount of time allowed by the secondary power source, for example, from approximately 5 seconds to approximately 30 seconds, from approximately 10 seconds to approximately 25 seconds, or approximately 15 seconds. Generally, if a device becomes affected by an outage, it may enter a "sleep" mode for the duration of the recognition period, wherein the radio and/or the processor are shut down to preserve the backup power.

If a status change ends prior to the end of the recognition period, the device may resume normal operation and may record the momentary status change in memory. The recorded status change may then be reported by a device in non-real-time as part of a normal, scheduled reporting process (e.g., daily).

However, if the status change persists beyond the recognition period, a device may employ an aggregated real-time or near real-time power outage/restoration reporting (RT-POR) algorithm to report the status change to a parent node.

Due to the fact that the device may be aware of its location within the network defined by each NAN access point, the aggregated algorithm may be location-based, such that the device may autonomously transmit status change report(s) in a way that increases the probability of the report(s) successfully reaching the NAN access point.

In one embodiment, each device receiving a status change report or experiencing a status change may prepare and transmit an aggregated status change report to one or more of its parent devices. Each device may prepare and transmit the aggregated status change report to one or more of its parent devices during a reporting period. A reporting period may comprise from approximately 1 second to approximately 5 seconds, for example, or approximately 1.5 seconds. Generally, the reporting period may depend on the secondary source of power employed at each device.

In one embodiment, a device may prepare a status change report including information regarding a status change. Such information may include, for example, the type of event, the start time and end time of the status change, the duration of the status change, the identity of the device, and/or the location of the device. The details regarding how each device generates a message for the aggregated status change report is described in more detail with respect to FIG. 3 below. A report may be prepared during each reporting window, or a single report may be prepared and repeatedly transmitted.

In one embodiment, the device may receive one or more child status change reports from one or more child devices. During each reporting window, the device may check for such child status reports and, in some embodiments, may include information from such reports in the status change report to be transmitted to the device's parent node. In other words, the device may aggregate status change reports from one or more child devices in the network during one or more reporting windows.

For example, during each reporting window, each device in a mesh network may check whether it has received new child status change reports and, if so, may transmit an aggregated status change report including this new information. Regardless of whether child status change reports are received or not, devices may continue re-transmitting the aggregated status change report at each reporting window, either until adequate power is no longer available for transmission or for a total of the entire reporting period.

As used herein, the term "child" refers to a device located a further distance away from an access point than the reference device. Similarly, the term "parent" refers to a device located closer to the access point than the reference device. By way of example, if a reference device is located 2 hops from an access point, a device located 1 hop from the access point may be referred to as a "parent device," and a device located 3 hops from the access point may be referred to as a "child device," with respect to the reference device.

In some embodiments, the device may suspend local generation of all other message transmissions, including but not limited to keep-alive messages and neighbor exchange procedures as used by the NAN network layer protocol, and may suspend the relay of data packets from other nodes in the network.

FIG. 3 depicts an exemplary secure aggregated status report 300, according to one or more embodiments of the invention. The aggregated status report 300 includes a plurality of records 302, one from each of Device A-Device E. Although in the present example, the aggregated report 300 includes one record 302 from each reporting device, each reporting device may include a plurality of records 302 in the status report 300. The reporting device that creates the first record includes the first report time 306 in, for example, a report header. Each device thereafter appends a record 302 to the aggregated status report 300. Each record includes information regarding the status change, such as the start time and end time of a status change, a duration of the status change, and/or a location of the reporting device. The record also includes an identity 304 of the reporting device. In the present example, the identity 304 is the IEEE Media Access Control address of the reporting device, although any identifier may be used that identifies the device to the head-end system. The reporting device then signs the record with keyed hash information 308.

The record information is not limited to the device identity 304 and keyed hash information 308. The record information may also include other information useful to understanding what event has occurred. For example in the case of a power failure, a report could include a field that indicates if an emergency generator was started or in the case of a pipeline failure if a shutoff valve was activated.

In the present exemplary secure aggregated report 300 the type of event being reported 307 is specified in the application header. However, the report may also be designed to contain different types of events. For example, the report may include power outage events as well as pipe line failure events, in which case an event type field is added to each record. If the report is constructed to only have one event type, the size of the records can be reduced by including a common event type field 307 that applies to all the records in the report.

In one embodiment, in order to create the hash information 308, the device extracts the first report time 306 from the header, the event type 307 if present, and appends the device's Media Access Code address. The integrity of the first report time, the event type, and the Media Access Code address identifier of the device are then protected using a keyed hash function, such as Cipher-based Message Authentication Code (MAC) using an AES-256 key. If there is additional information in the record, said information is added to the keyed hash calculation in order to protect the integrity of the additional information. Each device has a unique encryption key 206. Although, the time of the first record in addition to a Media Access Code address may be used for a keyed hash, any nonce combined with a unique identifier of the reporting device may be used to create the keyed hash that is included in the record. Although a message integrity check hash and key length is discussed, one skilled in the art will appreciate that any keyed hash function and other key sized appropriate for the security of the system may be utilized. In some embodiments, the AES-256 key used for the message integrity check has been previously established from the reporting device's communication with the back-end system; however any key establishment algorithm may be used, such as pre-configured keys, or a key algorithm such as Elliptic Curve Diffie-Hellman Exchange (ECDHE) key exchange protocol and the like. When the device has no additional records to append to the aggregated report 300, the device transmits the aggregated record to a next device (e.g., a parent device).

When the report is received on the back-end system, each record is authenticated to ensure it was created on the device specified in the device identity 304. The back-end system maintains a hash key, (i.e., encryption key 206) for each device. The device identity 304 is extracted from the record 302. The hash key associated with the identified device is used to create a hash using an identical process that was used by the reporting device. If the hash generated on the back-end system matches that included in the record, the record integrity is verified as well as identity of the reporting device. If the hashes do not match, the record is determined to be a false record and the record is discarded. Other validated records in the report may be accepted. The head end system may employ a further check to prevent a replay attack that repeats an authentic report. This check looks at the first report time. If this time matches a recent report or is too old to still be in memory, then the report is discarded.

As such, a malicious attack by a hacker is limited. Each record 302 in the aggregated report 300 is authenticated. In the event a hacker breaks into a meter and generates perhaps thousands of records, false records appearing to be generated by other meters will be discarded, thereby limiting the maliciousness of the attack.

Figure 4:
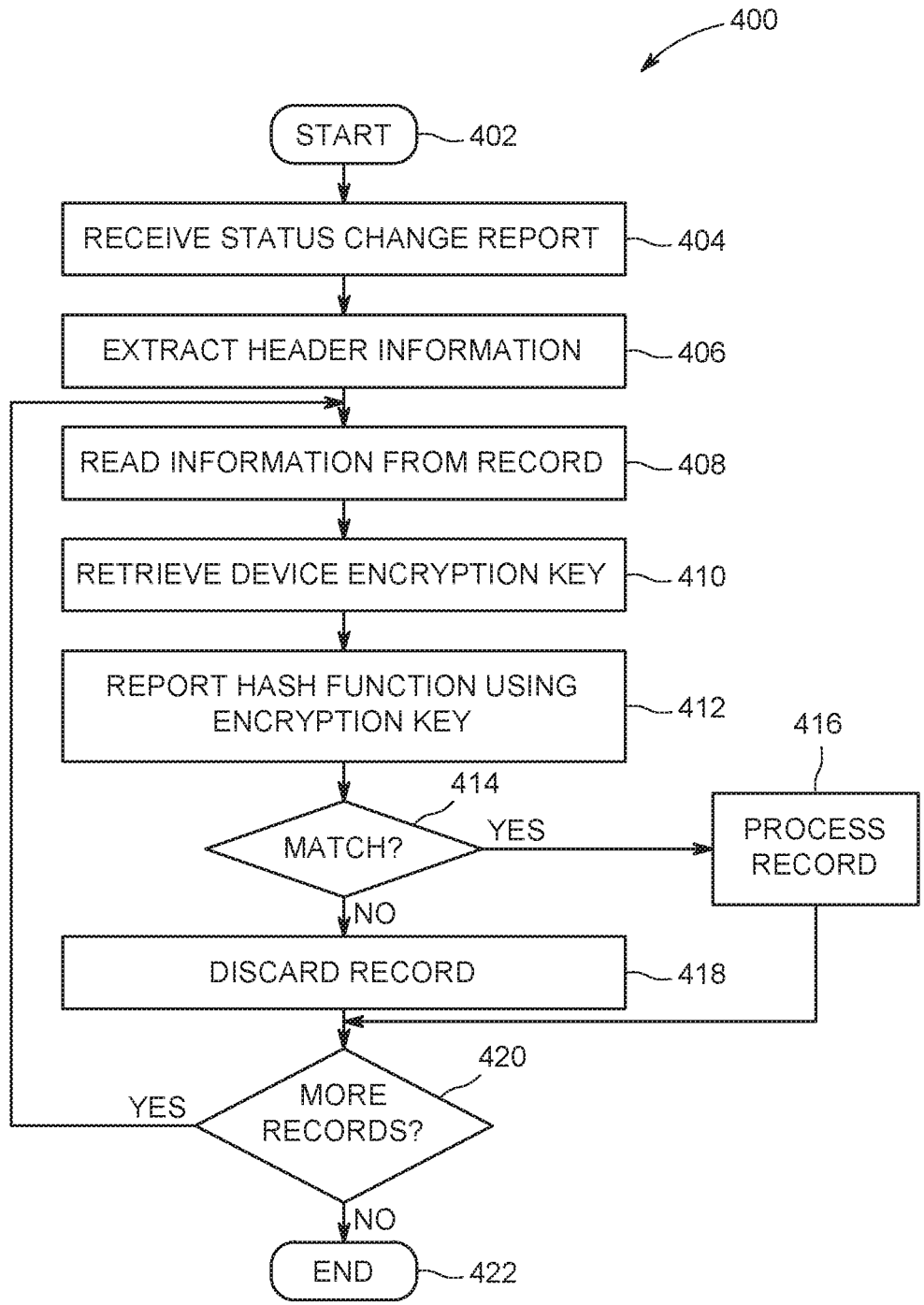
FIG. 4 depicts a flow diagram of a method for verifying records received in a secure aggregated report, according to one or more embodiments of the invention.

FIG. 4 depicts a flow diagram of a method 400 for verifying records received in a secure aggregated report, according to one or more embodiments of the invention. The method 400 starts at step 402 and proceeds to step 404.

At step 404, a head end system receives a secure aggregated event report. The secure aggregated event report comprises event records from a plurality of devices in a network, as described above.

At step 406, header information is extracted from the secure aggregated event report. The header information includes at least a First Report Time. In some instances, where the report includes events of a specific type, for example only records that relate to power failure events, or only records that relate to pipe line pressure failure events, the common event type is included in the header.

At step 408, a device identifier is extracted from a record. The record is retrieved from the report. The record includes a device identifier, a cryptographic hash, as well as other information regarding the event that is being reported. Each device identifier is associated with a unique encryption key. Using the device identifier, the associated encryption key is retrieved from a memory. The memory may be at an event application server, or the memory that contains the encryption keys for the devices may be remote from the event application server, in which case, the encryption key associated with the device identifier is retrieved from the remote memory.

At step 410, a hash is generated from at least the unique device identifier and the First Report Time. In the case where all records in the aggregated event report are from a plurality of event types, an event type is included in the record. In such case, the event type is also used to generate the hash.

At step 412, the generated hash is compared to a hash that was generated at the device and stored in the record. If the hashes match, the record is considered to be verified as coming from the device associated with the device identifier in the record and at step 416, the event record is processed and the method 400 proceeds to step 420.

However, if at step 414, it is determined that the hashes do not match, then the record is determined to be from a hacked device and at step 418, the record is discarded and the method proceeds to step 420.

At step 420, it is determined whether there are additional records in the secure aggregated event report. If there are additional records, the method 400 proceeds to step 408 and iterates until it is determined at step 420 that no additional records exist in the aggregated event report, at which time the method 400 proceeds to step 422 and ends. As such, malicious attacks are limited because when a record appears to be from a first device but the hashes do not match, it can be determined that the record was created on a second device and is not valid.

Figure 5:
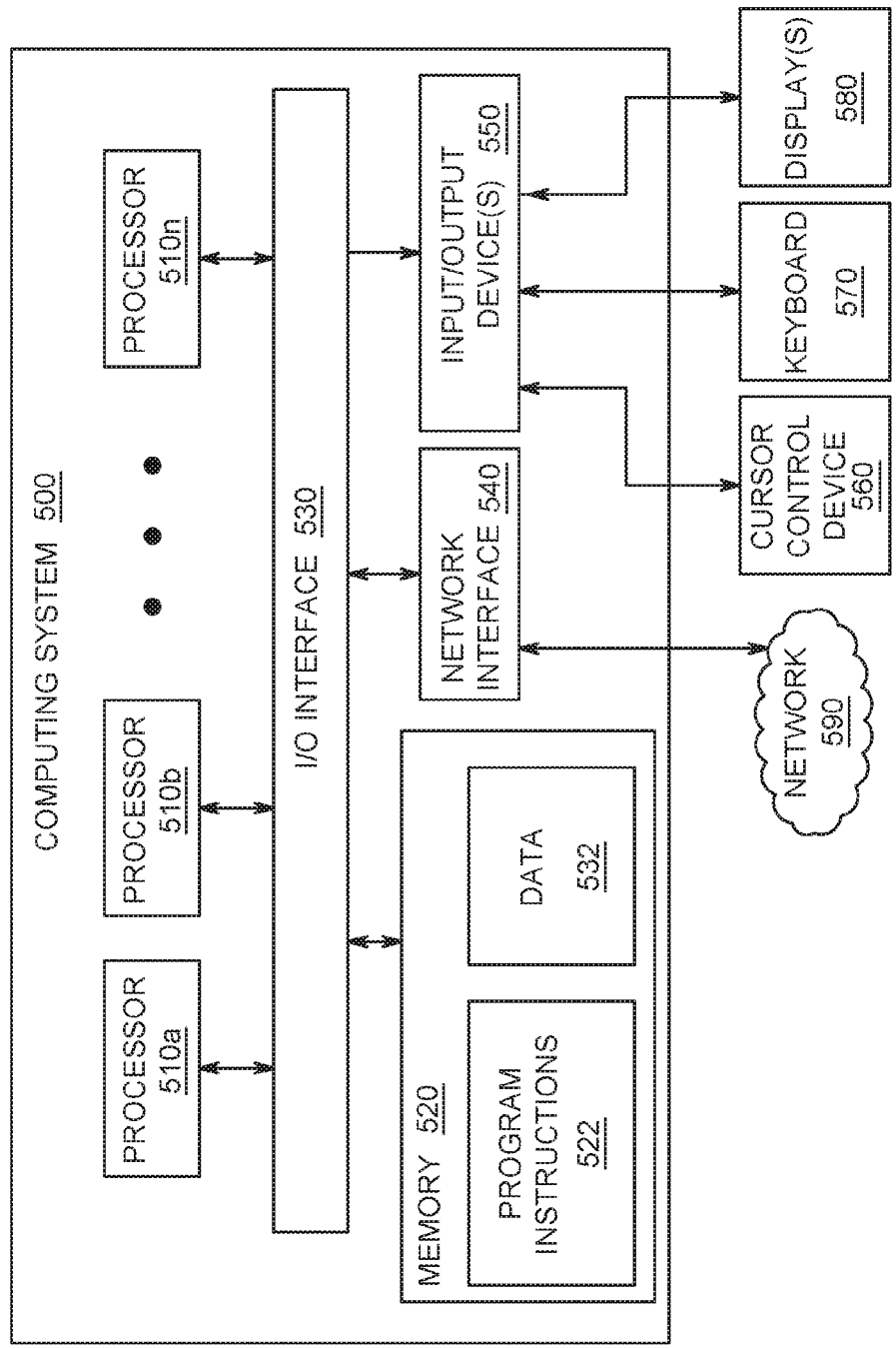
FIG. 5 depicts a computer system that can be utilized in various embodiments of the present invention to implement the computer and/or the display, according to one or more embodiments of the invention.

FIG. 5 depicts a computer system 500 that can be utilized in various embodiments of the present invention to implement the computer and/or the display, according to one or more embodiments.

Various embodiments of method and apparatus for secure aggregated event reporting, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement the method 400 as processor-executable executable program instructions 522 (e.g., program instructions executable by processor(s) 510) in various embodiments.

In the illustrated embodiment, computer system 500 includes one or more processors 510*a*-510*n* coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). The network interface 540 functionality may include a load balancer that distributes the event reporting load over the processors 510. The ability to scale the number of processors enables the computer system 500 to handle event reports from large numbers of devices. Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. The data stored in 532 may include the reporting device's keys used for the key hash function. In this case is it is advisable to protect this data by encrypting it. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A computer implemented method for generating a secure aggregated event report comprising:
   determining, by a device of a plurality of devices, that a status change has occurred at the device, wherein the status change is one of a loss of power or a restoration of power, temperature, pressure drop, pressure surge, pipe failure, sound, motion, signal light outages, street light outages, or flood detection;
   receiving, by the device, a status change report from one or more child devices;
   generating, by the device, a device status change record, wherein the status change record comprises an event type, unique device identifier, and one or more time fields for a start time of the status change, an end time of the status change, or a duration of the status change;
   generating, by the device, a record verification field, comprising:
      combining a nonce, the event type, and the unique device identifier;
      generating a message integrity check code for the combined nonce, event type and device identifier; and
      appending the message integrity check code to the device status change record;
   appending, by the device, the device status change record to the received status change report; and
   transmitting, by the device, the status change report to one or more parent devices toward a head end system;
   receiving, by the head end system, the status change report, wherein the status change report comprises at least one status change record from a device in a plurality of devices in a network;
   retrieving, by the head end system, the device identifier, the event type, and the message integrity check code from the at least one record;
   retrieving, by the head end system, an encryption key associated with the device identifier;
   performing, by the head end system, a keyed hash function on a combination of the nonce, the event type, and the unique device identifier using the encryption key associated with the device identifier;
   comparing, by the head end system, a result of the keyed hash function to the message integrity check code retrieved from the at least one record;
   determining, by the head end system, the record is from the device associated with the device identifier when the result of the keyed hash function matches the message integrity check code retrieved from the at least one record; and
   discarding, by the head end system, the record when the result of the keyed hash function does not match the message integrity check code retrieved from the at least one record.

2. The method of claim 1, wherein the nonce is a first report time of a first status change.

3. The method of claim 1, wherein the unique device identifier is a Media Access Control address of the device.

4. The method of claim 1, wherein generating the message integrity check comprises performing a keyed hash function on the combined nonce, the event type, and device identifier using a pre-defined encryption key associated with the device.

5. The method of claim 1, wherein the device status change record of the device includes additional information about the event.

6. The method of claim 5, wherein the message integrity check comprises performing a keyed hash function on the combined nonce, the event type, the device identifier, and the other information about the event.

7. The method of claim 1, wherein each record of the status change report comprises an event type associated with a type of the status change at the device, and wherein an event type of a first record of the status change report is different from an event type of a second record of the status change report.

8. The method of claim 1, wherein the status change report comprises a common event type that is used by each record.

9. A system for verifying records in a secure aggregated event report, comprising:
   a plurality of devices, wherein each device comprises:
      a) at least one processor;
      b) at least one input device; and
      c) at least one storage device storing processor executable instructions which, when executed by the at least one processor, perform a method including:
         determining, by a device, that a status change has occurred at the device, wherein the status change is one of a loss of power or a restoration of power, temperature, pressure drop, pressure surge, pipe failure, sound, motion, signal light outages, street light outages, or flood detection;
         receiving, by the device, a status change report from one or more child devices;
         generating, by the device, a device status change record, wherein the status change record comprises an event type, unique device identifier, and one or more time fields for a start time of the status change, an end time of the status change, or a duration of the status change;
         generating a record verification field, comprising:
            combining a nonce, the event type, and the unique device identifier;
            generating a message integrity check code for the combined nonce, event type and device identifier; and
            appending the message integrity check code to the device status change record;
         appending the device status change record to the received status change report; and
         transmitting, by the device, the status change report to one or more parent devices toward a head end system; and
   a server comprising:
      a) at least one processor;
      b) at least one input device; and
      c) at least one storage device storing processor executable instructions which, when executed by the at least one processor, perform a method including:
         receiving the status change report, wherein the status change report comprises at least one status change record from a device in a plurality of devices in a network;
         retrieving the device identifier, the event type, and the message integrity check code from the at least one record;
         retrieving an encryption key associated with the device identifier;
         performing a keyed hash function on a combination of the nonce, the event type, and the unique device identifier using the encryption key associated with the device identifier;
         comparing a result of the keyed hash function to the message integrity check code retrieved from the at least one record;
         determining the record is from the device associated with the device identifier when the result of the keyed hash function matches the message integrity check code retrieved from the at least one record; and
         discarding the record when the result of the keyed hash function does not match the message integrity check code retrieved from the at least one record.

10. The system of claim 9, wherein the nonce is a first report time of a first status change.

11. The system of claim 9, wherein the unique device identifier is a Media Access Control address of the device.

12. The system of claim 9, wherein generating the message integrity check comprises performing a keyed hash function on the combined nonce, the event type, and device identifier using a pre-defined encryption key associated with the device.

13. The system of claim 9, wherein the device status change record of the device includes additional information about the event.

14. The system of claim 13, wherein the message integrity check comprises performing a keyed hash function on the combined nonce, the event type, the device identifier, and the other information about the event.

15. The system of claim 9, wherein each record of the status change report comprises an event type associated with a type of the status change at the device, and wherein an event type of a first record of the status change report is different from an event type of a second record of the status change report.

16. The system of claim 9, wherein the status change report comprises a common event type that is used by each record.

17. A non-transitory computer readable medium for storing computer instructions that, when executed by at least one processor causes the at least one processor to perform a method for verifying records in a secure aggregated event report, comprising:
   determining, by a device of a plurality of devices, that a status change has occurred at the device, wherein the status change is one of a loss of power or a restoration of power, temperature, pressure drop, pressure surge, pipe failure, sound, motion, signal light outages, street light outages, or flood detection;
   receiving, by the device, a status change report from one or more child devices;
   generating, by the device, a device status change record, wherein the status change record comprises an event type, unique device identifier, and one or more time fields for a start time of the status change, an end time of the status change, or a duration of the status change;
   generating, by the device, a record verification field, comprising:
      combining a nonce, the event type, and the unique device identifier;
      generating a message integrity check code for the combined nonce, event type and device identifier; and
      appending the message integrity check code to the device status change record;
   appending, by the device, the device status change record to the received status change report; and transmitting, by the device, the status change report to one or more parent devices toward a head end system;

receiving, by the head end system, the status change report, wherein the status change report comprises at least one status change record from a device in a plurality of devices in a network;

retrieving, by the head end system, the unique device identifier, the event type, and a message integrity check code from the at least one record, wherein the device identifier is unique to the device;

retrieving, by the head end system, an encryption key associated with the device identifier;

performing, by the head end system, a keyed hash function on a combination of a nonce, the event type, and the unique device identifier using the encryption key associated with the device identifier; comparing a result of the keyed hash function to the message integrity check code retrieved from at least one record;

determining, by the head end system, the record is from the device associated with the device identifier when the result of the keyed hash function matches the message integrity check code retrieved from at least one record; and discarding, by the head end system, the record when the result of the keyed hash function does not match the message integrity check code retrieved from at least one record.

\* \* \* \* \*